(12) United States Patent
Liang

(10) Patent No.: US 10,386,701 B1
(45) Date of Patent: Aug. 20, 2019

(54) MOBILE DEVICE ENABLING COLLABORATION WITH FLASHES OF OTHER DEVICES AND METHOD THEREOF

(71) Applicant: NANNING FUGUI PRECISION INDUSTRIAL CO., LTD., Nanning (CN)

(72) Inventor: Yuan-Tao Liang, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 15/990,941

(22) Filed: May 29, 2018

(51) Int. Cl.
*H04N 5/232* (2006.01)
*G03B 15/05* (2006.01)
*H04N 5/225* (2006.01)

(52) U.S. Cl.
CPC ............. *G03B 15/05* (2013.01); *H04N 5/232* (2013.01); *G03B 2215/0557* (2013.01); *H04N 5/2256* (2013.01)

(58) Field of Classification Search
CPC ................................. G03B 15/05; H04N 5/225
USPC .......................................................... 348/371
See application file for complete search history.

(56) References Cited

U.S. PATENT DOCUMENTS

| 2012/0051726 A1* | 3/2012 | King ...................... G03B 15/02 396/4 |
| 2013/0120636 A1* | 5/2013 | Baer .................... H04N 5/2354 348/335 |

FOREIGN PATENT DOCUMENTS

CN 105812673 A 7/2016

\* cited by examiner

*Primary Examiner* — Joel W Fosselman
(74) *Attorney, Agent, or Firm* — ScienBiziP, P.C.

(57) ABSTRACT

A method for collaborating with other mobile devices (OMDs) in flash which is applied in a mobile device pre-captures an image of a subject taken by the mobile device, and analyzes the pre-captured image for optimal lighting. If lighting is not optimal, the mobile device calculates additional flash positions and identifies nearby OMDs in close proximity to the flash positions. User of the mobile device can make a selection of one or more nearby OMDs through a user interface, and the mobile device can request each OMD to move to a flash position and generate a synchronized flash when the mobile device is capturing the image. The image so taken and images from different camera angles can then be shared.

8 Claims, 9 Drawing Sheets

MOBILE DEVICE ENABLING COLLABORATION WITH FLASHES OF OTHER DEVICES AND METHOD THEREOF

FIELD

The subject matter herein generally relates to mobile device functions.

BACKGROUND

Using cameras of mobile devices to capture images are popular. Such cameras may have highly developed pixel counts, aperture control, focusing speed, anti-vibration dampers, and so on. However, low-light performance mainly relies on large-size charge-coupled devices and large an aperture. Accordingly, it can be difficult to capture image with ideal brightness.

Flashs with two-color temperatures have emerged. These comprise two LEDs, one is a white light LED and the other is a warm light LED, these can flash to mimic natural illumination when capturing images. The lighting of a scene is still limited when only one mobile device is used. Problems of using a single flash may include that the portrait is shiny or lacks depth, and the light effects are not obvious when taking long shots. Some mobile device manufacturers have introduced a xenon lamp as a supplemental lighting device, but customers need to buy such an extra device to mount on the mobile device and there is no way to supplement the lighting from different directions.

Accordingly, there is room for improvement within the art.

BRIEF DESCRIPTION OF THE DRAWINGS

Implementations of the present technology will now be described, by way of example only, with reference to the attached figures, wherein.

DETAILED DESCRIPTION

Figure 1:
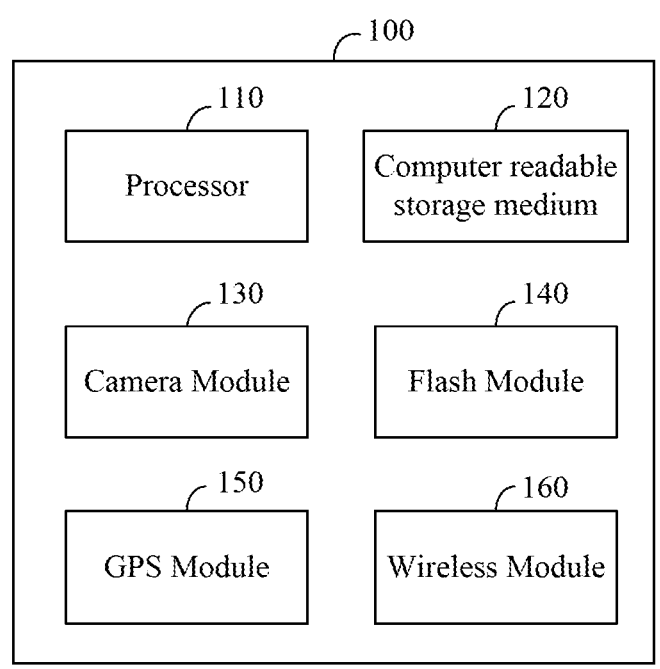
FIG. 1 is a block diagram of an embodiment of a mobile device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates a mobile device 100 in accordance with an embodiment for capturing images by collaborating with other mobile devices. The mobile device 100 may be a cellular phone, a tablet, or other device. The mobile device 100 may comprise a processor 110 and a computer readable storage medium 120. The processor 110 is a central processor of the mobile device 100 and may consist of one or more integrated circuits, such as a single core or multi-core microprocessor or microcontroller, to communicate with a number of modules of the mobile device 100 and control the functions of the mobile device 100. The computer readable storage medium 120 may be any form of computer readable storage medium, such as flash memory, or any other non-volatile storage medium. The computer readable storage medium 120 may store one or more computer programs for operating the mobile device 100, and be executed by the processor.

The modules of the mobile device 100 that communicate with the processor may comprise a camera module 130, a flash module 140, a global positioning system (GPS) module 150, and a wireless module 160. The camera module 130 captures an image. The flash module 140 generates a flash of light. The camera module 130 may comprise a lens, a charge coupled device (CCD), auto-focus mechanisms, and basic image processing mechanisms used with captured images. The GPS module 150 may identify a latitude and longitude or other geographical location information of the mobile device 100. The wireless module 160 may comprise WI-FI, BLUETOOTH, and similar interfaces. The wireless module 160 is operable to exchange wireless data and position the mobile device 100.

Figure 2:
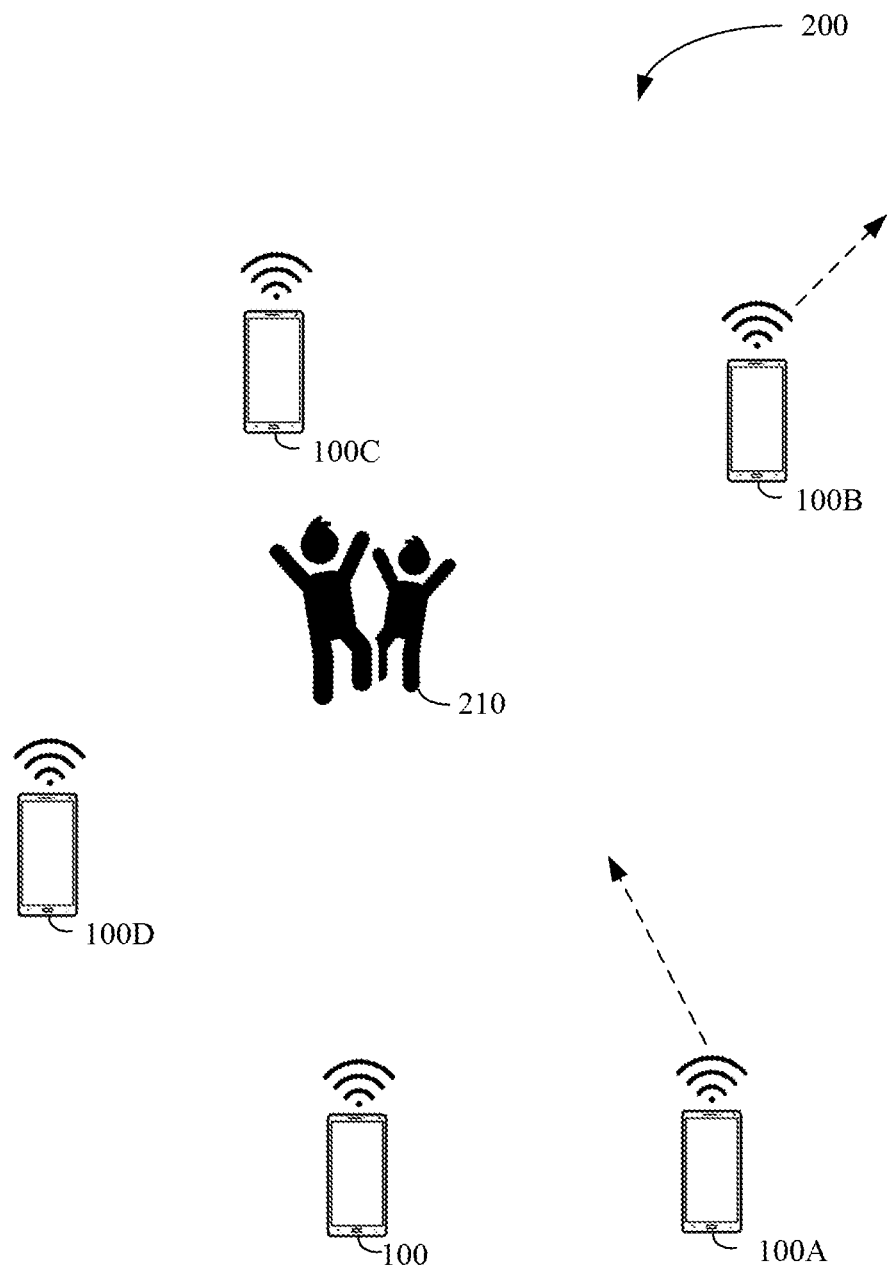
FIG. 2 is a schematic diagram of an embodiment of an environment in which flashes can collaborate.

FIG. 2 illustrates an environment 200 in accordance with an embodiment for capturing images using the mobile device 100 in collaboration with other mobile devices, 100A, 100B, 100C, and 100D. In an embodiment, each mobile device 100 and 100A-100D may download and install an image capture application to capture a digital image by using the flashes of other mobile devices as off-camera flashes. The mobile device 100 may communicate with other mobile devices 100A-100D using the image capture application, through the wireless module 160. When the image capture application determines that available lighting is not optimal for shooting a subject 210, the mobile device 100 may request the mobile devices 100A-100D to act as off-camera flashes. The non-optimal lighting may comprise low light condition, image backlighting, ambient brightness unevenness, and ambient light hue deviation. When the mobile devices 100A-100D agree to participate in a collaboration, some of the mobile devices may receive move position indication (e.g., dotted arrow lines shown in FIG. 2 for mobile devices 100A and 100B). After all the mobile devices are located in the ideal positions, shooting time and the generation of flashes are synchronized.

In an embodiment, a user may activate the image capture application and focus properly on the subject 210 in the field of view of the mobile device 100. The image capture application may acquire position information of the mobile device 100 through the GPS module 150 or other positioning technology and receive position information of the mobile devices 100A-100D through the wireless module 160. In an embodiment, the image capture application creates a map comprising the positions of the mobile devices 100-100D, indicated directions of movements, and distances to the subject 210.

Figure 3:
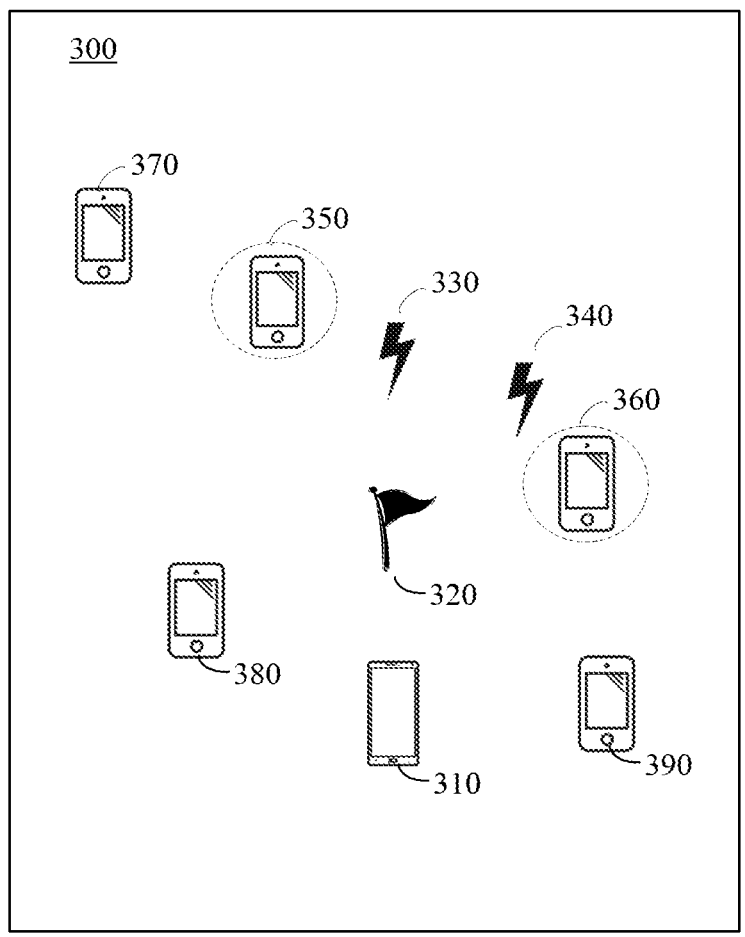
FIG. 3 is a screen shot of an embodiment of a user interface of an image capture application.

In an embodiment, the image capture application may determine whether to use off-camera flash for supplemental lighting. For example, in a low-light environment, ambient light only provides background exposure and the flash light is the key light source. The image capture application may mark suggested positions of off-camera flashes and mobile devices which are in close proximity to the suggested positions. FIG. 3 is a screen shot of one example of user interface 300, such as that generated by the image capture application operating on the mobile device 100. The user interface 300 displays the map details. The icon 310 represents the mobile device 100, and the icon 320 represents the subject 210. The selectable icons 330 and 340 represent the suggested positions of off-camera flashes and the selectable icons 350 and 360 represent mobile devices that are close to the suggested positions. The selectable icons 350 and 360 are further marked with dotted circles to differentiate them from other icons (e.g. icons 370, 380, and 390). The suggested positions may be calculated by light source directions and positions. In an embodiment, the image capture application may suggest that one off-camera flash be placed behind the subject 210 (e.g. icon 330) to highlight the subject 210. The image capture application may suggest that another off-camera flash be placed obliquely to the subject 210 (e.g. icon 340) to increase stereoscopic perception of the subject 210.

Figure 4:
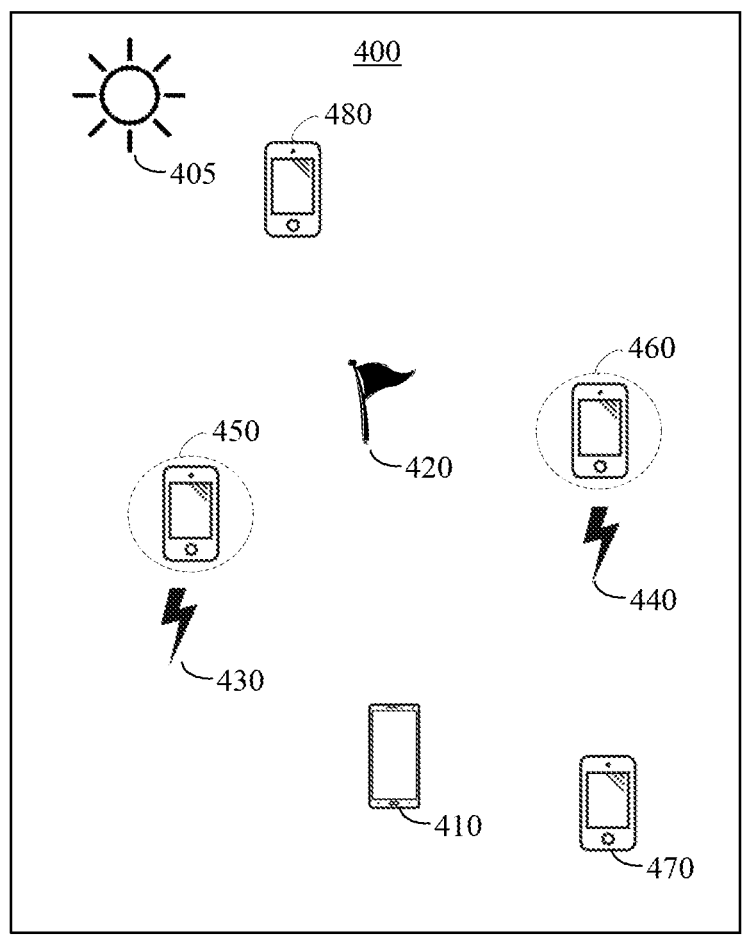
FIG. 4 is a screen shot of another embodiment of a user interface of the image capture application.

In another embodiment, the image capture application may determine to supplement the lighting when there is an ambient light source behind the subject 210 to create a highlight that separates the subject 210 from the background. In the example, the off-camera flash provides secondary light source in addition to the ambient light source and provides appropriate lighting in order for the subject 210 to be properly exposed. FIG. 4 is a screen shot of another one example of user interface 400, such as that generated by the image capture application operating on the mobile device 100. The user interface 400 displays the map details. The icon 405 represents a key light source, which is a sunlight, for shooting the subject 210. The icon 410 represents the mobile device 100, and the icon 420 represents the subject 210. The selectable icons 430 and 440 represent the suggested positions of off-camera flashes and the selectable icons 450 and 460 represent mobile devices that are in close proximity to the suggested positions. The selectable icons 450 and 460 are further marked with dotted circles in order to differentiate from other icons (e.g. icons 470 and 480). In an embodiment, the image capture application may suggest that one off-camera flash be placed at each side of the subject 210 (e.g. icon 430) to input light into a dark, shadowy area that the key light cannot reach. The image capture application may suggest that another off-camera flash be placed on the opposite side of the subject 210 (e.g. icon 440) to even out features of the subject 210.

Figure 5:
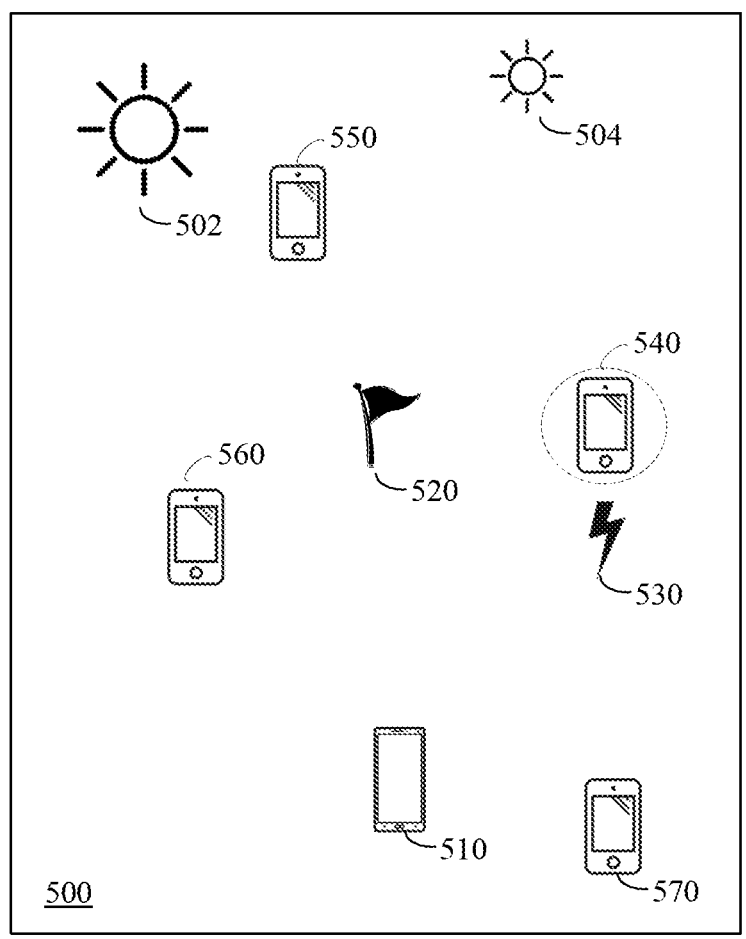
FIG. 5 is a screen shot of another embodiment of a user interface of the image capture application.

In another embodiment, the image capture application may determine to supplement the lighting when there is uneven ambient brightness. In the example, a shooting scene of the subject 210 has a high contrast lighting. FIG. 5 is a screen shot of another embodiment user interface 500, such as that generated by the image capture application operating on the mobile device 100. The user interface 500 displays the map details. The icons 502 and 504 represent different light sources that result in high contrast lighting within a scene of the subject 210. The icon 510 represents the mobile device 100, and the icon 520 represents the subject 210. The selectable icon 530 represents the suggested position of off-camera flashes and the selectable icon 540 represents a mobile device in close proximity to the suggested position. The selectable icon 540 is further marked with dotted circle in order to differentiate it from other icons (e.g. icons 550, 560, and 570). In an embodiment, the image capture application may suggest that one off-camera flash be placed in a shadowed side of the scene (e.g. icon 530) to show details in the darkest shadows.

Figure 6:
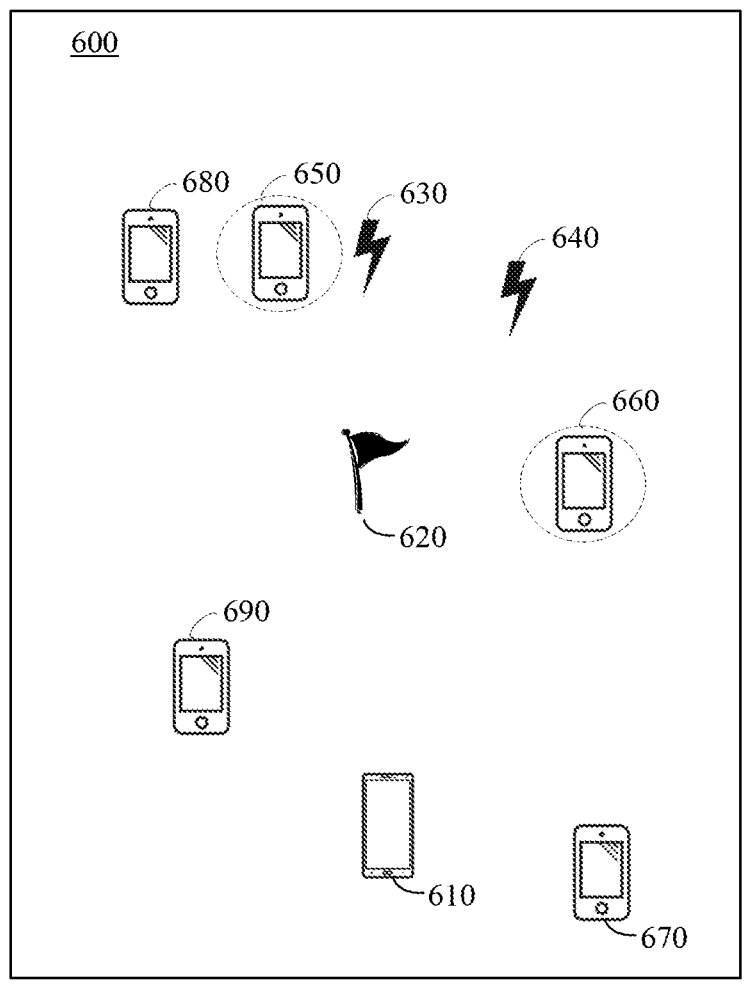
FIG. 6 is a screen shot of another embodiment of a user interface of the image capture application.

In another embodiment, the image capture application may determine to supplement the lighting when the subject 210 takes on greenish hue under fluorescent lighting. In the example, even if white balance is used, most colors will be lost. It is necessary to eliminate an ambient light and let a flash be a key light source. FIG. 6 is a screen shot of another embodiment user interface 600, such as that generated by the image capture application operating on the mobile device 100. The user interface 600 displays the map details. The icon 610 represents the mobile device 100, and the icon 620 represents the subject 210. The selectable icons 630 and 640 represent the suggested position of off-camera flashes and the selectable icons 650 and 660 represent mobile devices that are in close proximity to the suggested positions. The selectable icons 650 and 660 are further marked with dotted circles for differentiation from other icons (e.g. icons 670, 680, and 690). In an embodiment, the image capture application may suggest that more than one off-camera flash be used to correct color hue deviation (e.g. icons 630 and 640).

In an embodiment, the user of the mobile device 100 may select on or more mobile devices and suggested positions of off-camera flashes corresponding to the selected mobile devices on the user interface of the image capture application. Referring to FIG. 3, for example, the user may select icon 350 and icon 330 on the user interface 300. In an embodiment, when one or more mobile devices are selected, an image capture screen may be displayed on the user interface 300 so that the user can interact with and control the capturing of images. In an embodiment, when the user presses a capture button on the image capture screen, the mobile device 100 may transmit collaboration request to the selected mobile device through the wireless module 160. Thereby, a user of the selected mobile device is requested or invited to manually orientate the selected mobile device to point a lens and a flash toward the subject 210, and physically move to the indicated position. Once the user of the selected mobile device has accepted request and moved to the requested position, the selected mobile device responds to the mobile device 100. After receiving response from selected mobile device, the mobile device 100 may use WI-FI Certified TimeSync™ technology for delivering precise time synchronization between the mobile device 100 and the selected mobile device to collaborate in image capture with the flash module of the selected mobile device.

Figure 7:
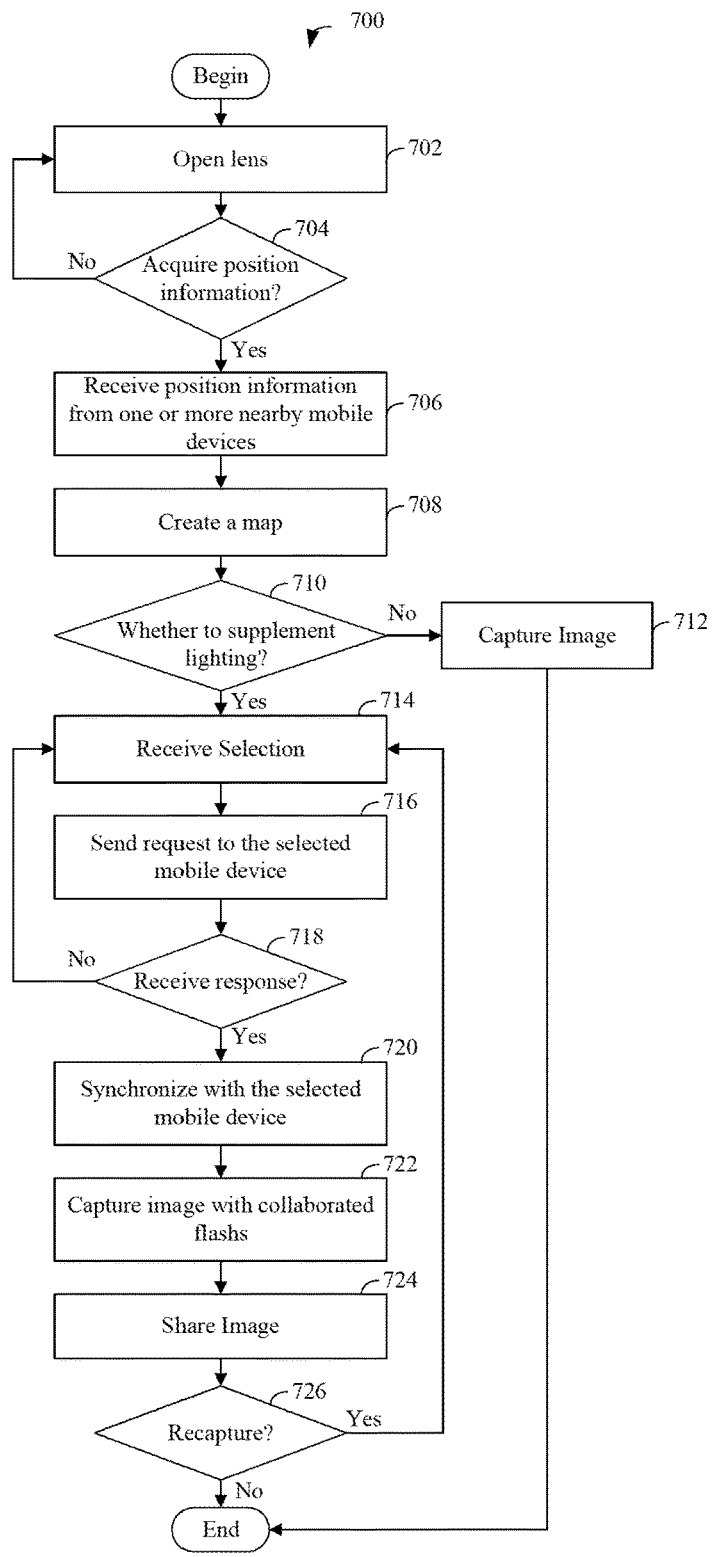
FIG. 7 is a flowchart of method in an embodiment for a single mobile device to initiate flash collaboration.

FIG. 7 illustrates a flowchart of a process 700 to initiate flash collaboration on the mobile device 100. At step 702, the user of the mobile device 100 activates the image capture application and opens a lens to focus on the subject 210 in the field of view. The image capture application determines whether to acquire position information of the mobile device 100 at step 704. If the position information of the mobile device 100 is acquired successfully, the process 700 proceeds to step 706, otherwise the process 700 rolls back to step 702. The mobile device 100 receives position information of other mobile devices which may wirelessly communicate with the mobile device 100 at step 706 and creates the map comprising positions of the mobile device 100 and other mobile devices, the indicated directions of movements, and respective distances to the subject 210 at step 708. At step 710, the image capture application determines whether to supplement the lighting by using the flashes of the other mobile devices to act as off-camera flashes. If the image capture application determines there is no need for same, the camera module 130 captures image normally at step 712, and the process 700 is finished. If the image capture application determines that supplemental lighting is due because of non-optimal lighting at step 712, the process 700 then proceeds to step 714. At step 714, the image capture application displays a user interface on the mobile device 100 for the user to select one or more mobile devices that are located in close proximity to the suggested positions, for off-camera flashes. Upon receiving selection input from the user, a set of selected mobile devices may be identified and then the image capture screen is displayed on the user interface. When the user presses the capture button on the image capture screen, a request to collaborate with position information is sent to each of the selected mobile devices at step 716. At step 718, the image capture application determines whether a response is received from each of the selected mobile devices. If the image capture application receives all responses from the selected mobile devices, the process 700 proceeds to step 720, otherwise the process 700 rolls back to step 714 to let the user to make a new selection. At step 720, the mobile device 100 synchronizes image capture time with the selected mobile devices to generate flashes that are synchronized with the capture of the image of the subject 210 by the mobile device 100. At step 722, the mobile device 100 captures image of the subject 210 with the selected mobile devices acting as off-camera flashes. At step 724, the mobile device 100 can share the image with the selected mobile devices by the wireless module 160. At step 726, the image capture application prompts the user to decide whether to capture of another image of the subject 210 is required. If the user decides to capture another image, the process 700 rolls back to step 714, otherwise the process 700 is finished.

Figure 8:
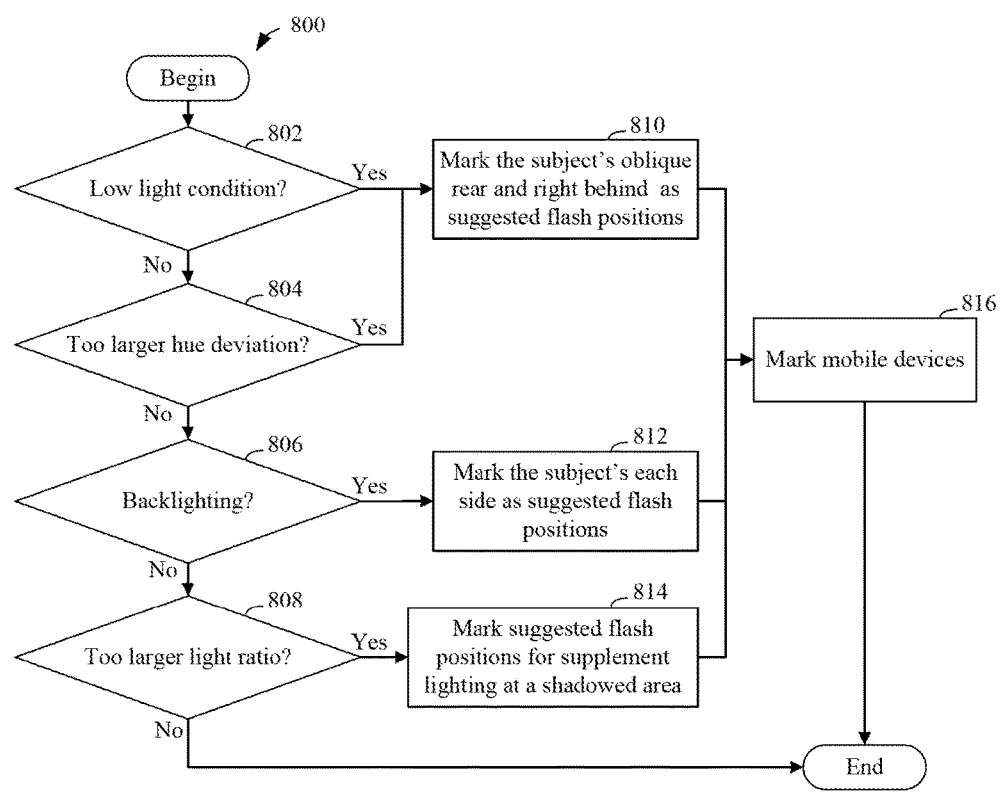
FIG. 8 is a flowchart of an embodiment to provide supplemental lighting suggestion.

FIG. 8 illustrates a flowchart of a process 800 of details of step 710. In an embodiment, the image capture application may pre-capture an image for analysis to determine whether lighting is optimal or otherwise. At step 802, the image capture application determines whether low light conditions pertain. If so, the image capture application suggests supplementing the lighting obliquely, at rear and right behind the subject 210, by displaying suggested flash positions on the user interface at step 810. Otherwise, the process 800 proceeds to step 804. At step 804, the image capture application determines whether degree of hue deviation is too high due to existing light sources. If the pre-captured image shows such hue deviation, the process 800 proceeds to step 810, otherwise the process 800 proceeds to step 806. At step 806, the image capture application further determines whether to backlight the capture. If the subject 210 is to be backlit, the image capture application suggests adding light at each side of the subject 210 by displaying suggested flash positions on the user interface, at step 812. Otherwise, the process 800 proceeds to step 808. At step 808, the image capture application determines whether light ratio is too high due to existing light sources. If the pre-captured image has such light ratio, the image capture application suggests adding light at a shadowed area of the captured scene at step 814. Otherwise, the process 800 is finished. At step 816, the image capture application displays, on the user interface, mobile devices which are in close proximity to the suggested flash positions.

Figure 9:
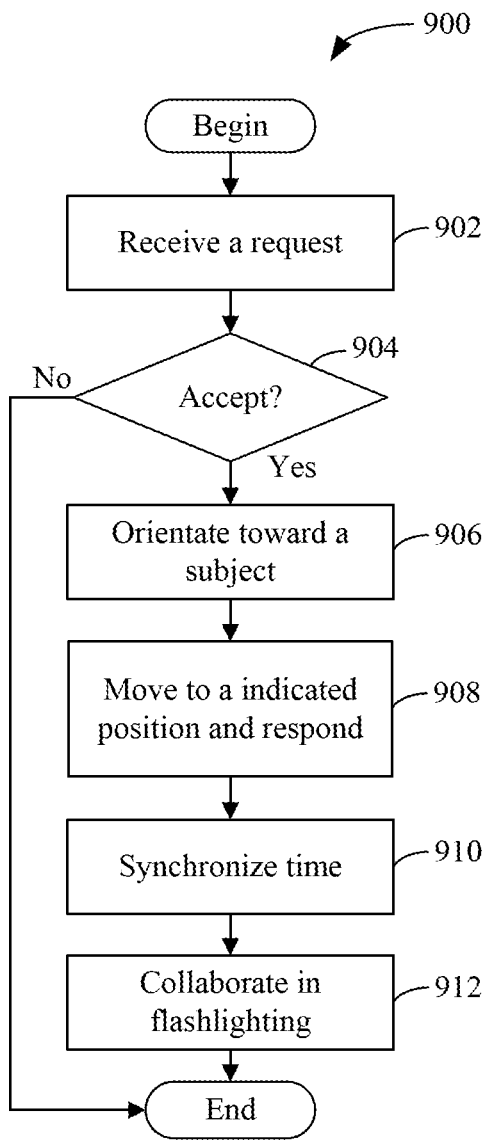
FIG. 9 is a flowchart of method, in an embodiment, for a selected mobile device to collaborate in flash a scene.

FIG. 9 illustrates a flowchart of a process 900 to collaborate with each of the selected mobile devices for flash. At step 902, the selected mobile device receives the collaboration request from the mobile device 100. At step 904, a software capture application operating on the selected mobile device prompts a user whether to accept the collaboration request. If the user accepts the collaboration request, the process 900 proceeds to step 906, otherwise the process 900 is finished. At step 906, the software capture application prompts the user to orientate the selected mobile device to point a lens and a flash toward the subject 210, through a user interface. At step 908, the software capture application prompts the user to move to a position requested in the collaboration request, and responds to the mobile device 100 when the selected mobile device is in position. At step 910, the selected mobile device receives image capture time from the mobile device 100 and synchronizes time with the mobile device 100. At step 912, the selected mobile device acts as an off-camera flash to generate a synchronized flash when the mobile device captures an image of the subject 210, and the process is then finished.

The collaboration for flash implemented by the software capture application is easy to use, and removes the burden of purchasing one or more dedicated off-camera flashes. The flash collaboration also makes up for deficiencies of the flash module 140 of the mobile device 100. In a scenario, a plurality of mobile devices may collaborate to capture an image which is ideally lit, and can share images of a scene from different capture angles with each other.

The embodiments shown and described above are only examples. Many details are often found in the art such as the other features of a portable device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A mobile device enabling collaboration with flashes of one or more nearby mobile devices, the mobile device comprising:
- a processor;
- a computer readable storage medium for storing at least one computer program, wherein the computer program comprises instructions which are executed by the processor, and performs the following steps:
- receiving position information from one or more nearby mobile devices;
- creating a map comprising positions of the mobile device and the one or more nearby mobile devices, and distances to a subject to be captured;
- pre-capturing an image of a subject;
- determining whether to supplement lighting by collaboration with flashes of the one or more nearby mobile devices, wherein the determining whether to supplement lighting by collaboration with flashes of the one or more nearby mobile devices further comprises: determining whether the mobile device is in low light conditions and determining whether there is too large a hue deviation in the pre-captured image;
- wherein if said determining whether to supplement lighting comprises determining to supplement lighting, then the processor further performing the following steps:
- suggesting one or more flash positions, wherein if the mobile device is in low light condition, the suggesting one or more flash positions comprising suggesting to supplement lighting obliquely, at rear and right behind the subject, and if there is too large a hue deviation in the pre-captured image, the suggesting one or more flash positions comprising suggesting to supplement lighting obliquely, at rear and right behind the subject;
- displaying the one or more nearby mobile devices and the one or more suggested flash positions on a user interface;
- receiving a selection of a user from the user interface comprising a set of selected nearby mobile devices;
- synchronizing image capture time with the set of selected nearby mobile devices; and
- capturing an image of the subject with the selected nearby mobile devices generating synchronized flashes.

2. The mobile device of claim 1, wherein if there is not too large a hue deviation in the pre-captured image, then the determining whether to supplement lighting by collaboration with flashes of the one or more nearby mobile devices further comprises:
- determining whether to capture in backlighting, wherein if the subject is being captured in backlighting, the suggesting one or more flash positions comprising suggesting to supplement lighting at each side of the subject.

3. The mobile device of claim 2, wherein if the subject is not being captured in backlighting, then the determining whether to supplement lighting by collaboration with flashes of the one or more nearby mobile devices further comprises:
- determining whether there is too large a light ratio in the pre-captured image, wherein if there is too large a light ratio in the pre-captured image, the suggesting one or more flash positions comprising suggesting to supplement lighting at a shadowed area of a scene of the pre-captured image.

4. The mobile device of claim 1, wherein the one or more suggested flash positions are calculated by light sources directions and positions.

5. The method of claim 1, wherein if there is not too large a hue deviation in the pre-captured image, then the determining whether to supplement lighting by collaboration with flashes of the one or more nearby mobile devices further comprises:
- determining whether to capture in backlighting, wherein if the subject is being captured in backlighting, the suggesting one or more flash positions comprising suggesting to supplement lighting at each side of the subject.

6. The method of claim 5, wherein if the subject is not being captured in backlighting, then the determining whether to supplement lighting by collaboration with flashes of the one or more nearby mobile devices further comprises:
- determining whether there is too large a light ratio in the pre-captured image, wherein if there is too large a light ratio in the pre-captured image, the suggesting one or more flash positions comprising suggesting to supplement lighting at a shadowed area of a scene of the pre-captured image.

7. A method for enabling collaboration of flashes of one or more nearby mobile devices, the method comprising:
- receiving position information from one or more nearby mobile devices;
- creating a map comprising positions of the first and the one or more nearby mobile devices, and distances to a subject to be captured;
- pre-capturing an image of a subject;
- determining whether to supplement lighting by collaboration with flashes of the one or more nearby mobile devices, wherein the determining whether to supplement lighting by collaboration with flashes of the one or more nearby mobile devices further comprises: determining whether the mobile device is in low light conditions and determining whether there is too large a hue deviation in the pre-captured image;
- wherein if said determining whether to supplement lighting comprises determining to supplement lighting, then the method further performing the following steps:
- suggesting one or more flash positions, wherein if the mobile device is in low light condition, the suggesting one or more flash positions comprising suggesting to supplement lighting obliquely, at rear and right behind the subject, and if there is too large a hue deviation in the pre-captured image, the suggesting one or more flash positions comprising suggesting to supplement lighting obliquely, at rear and right behind the subject;
- displaying the one or more nearby mobile devices and the one or more suggested flash positions on a user interface;
- receiving a selection of a user from the user interface comprising a set of selected nearby mobile devices;
- synchronizing image capture time with the set of selected nearby mobile devices; and
- capturing an image of the subject with the selected nearby mobile devices generating synchronized flashes.

8. The method of claim 7, wherein the one or more suggested flash positions are calculated by light sources directions and positions.

* * * * *